United States Patent Office 2,825,247
Patented Mar. 4, 1958

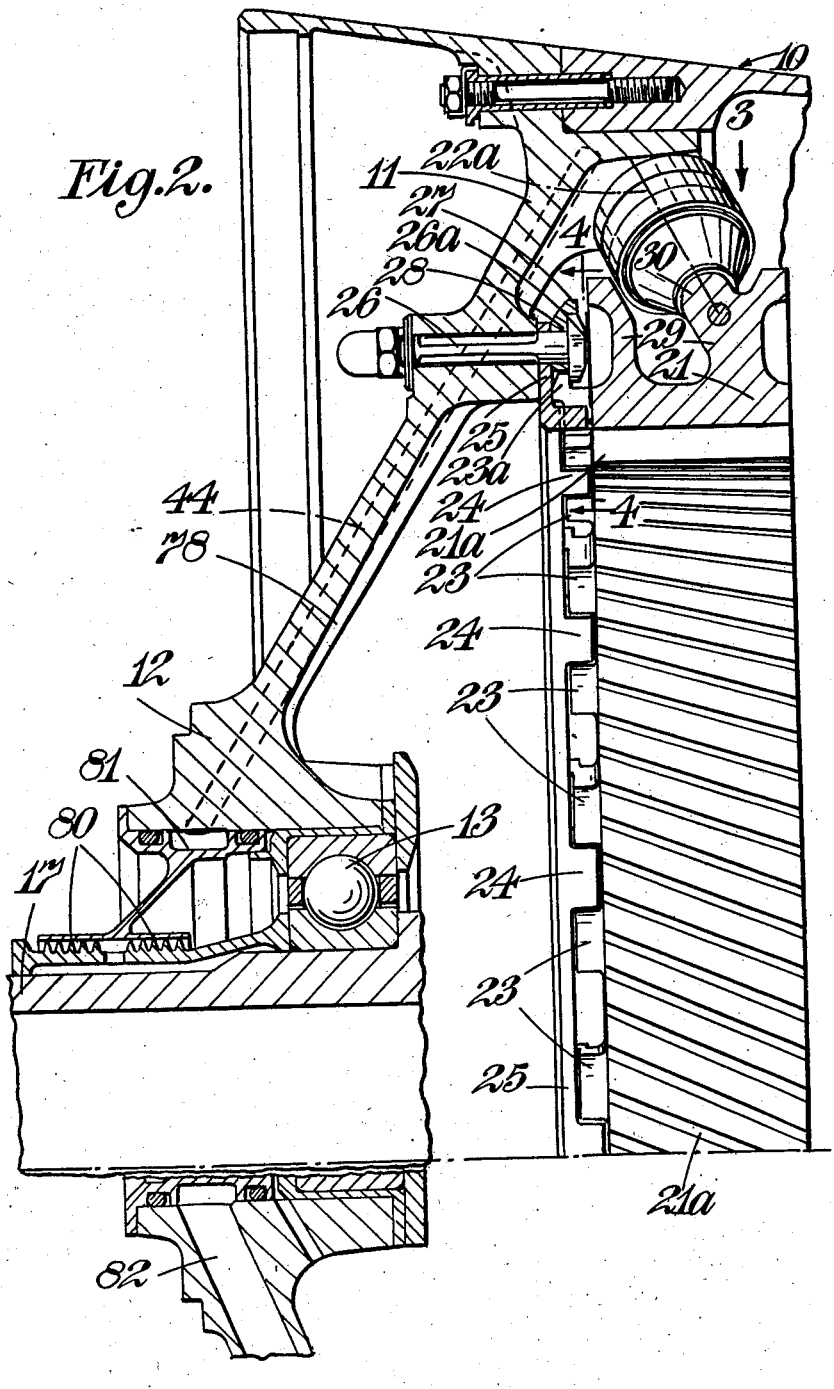

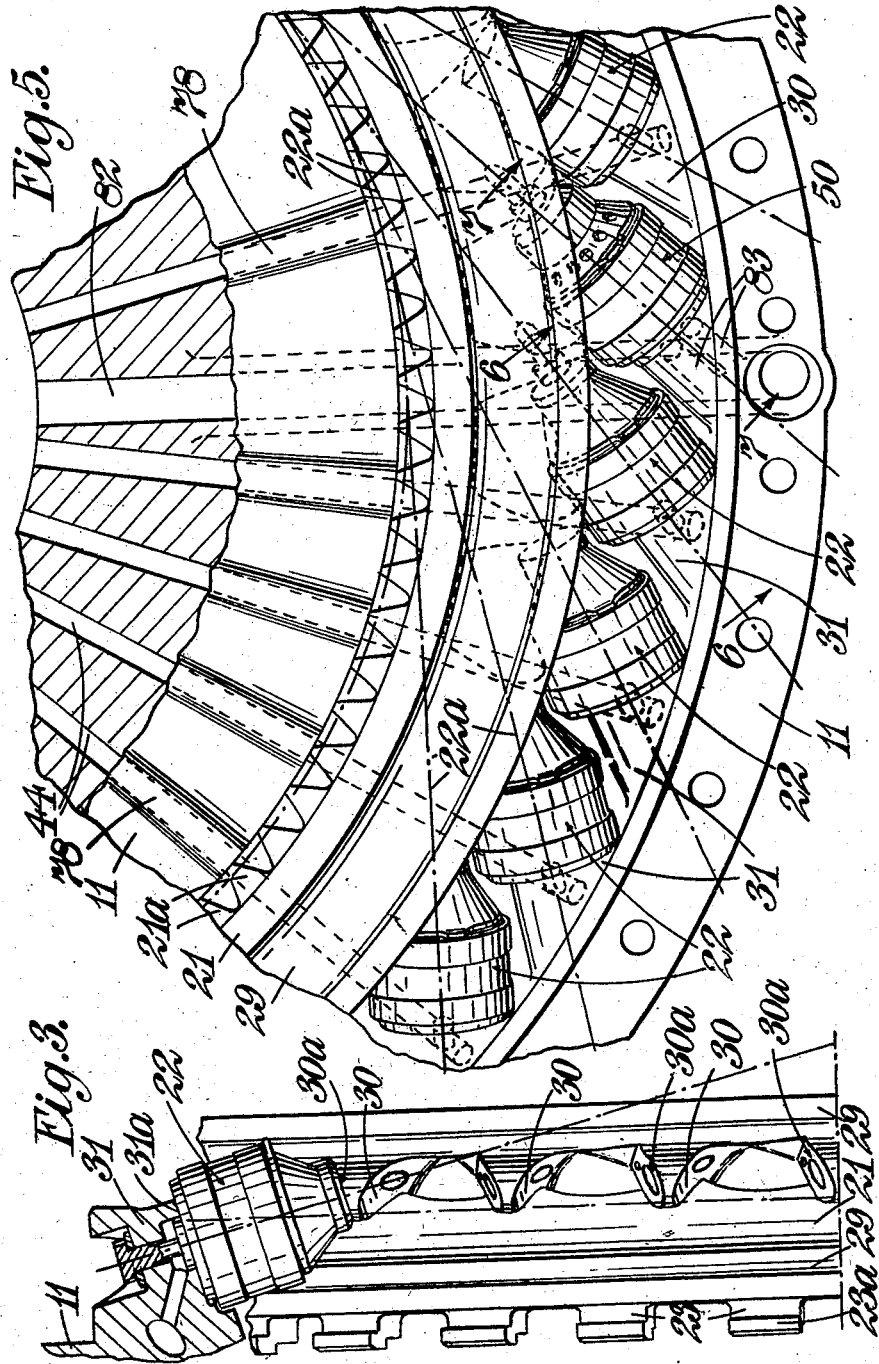

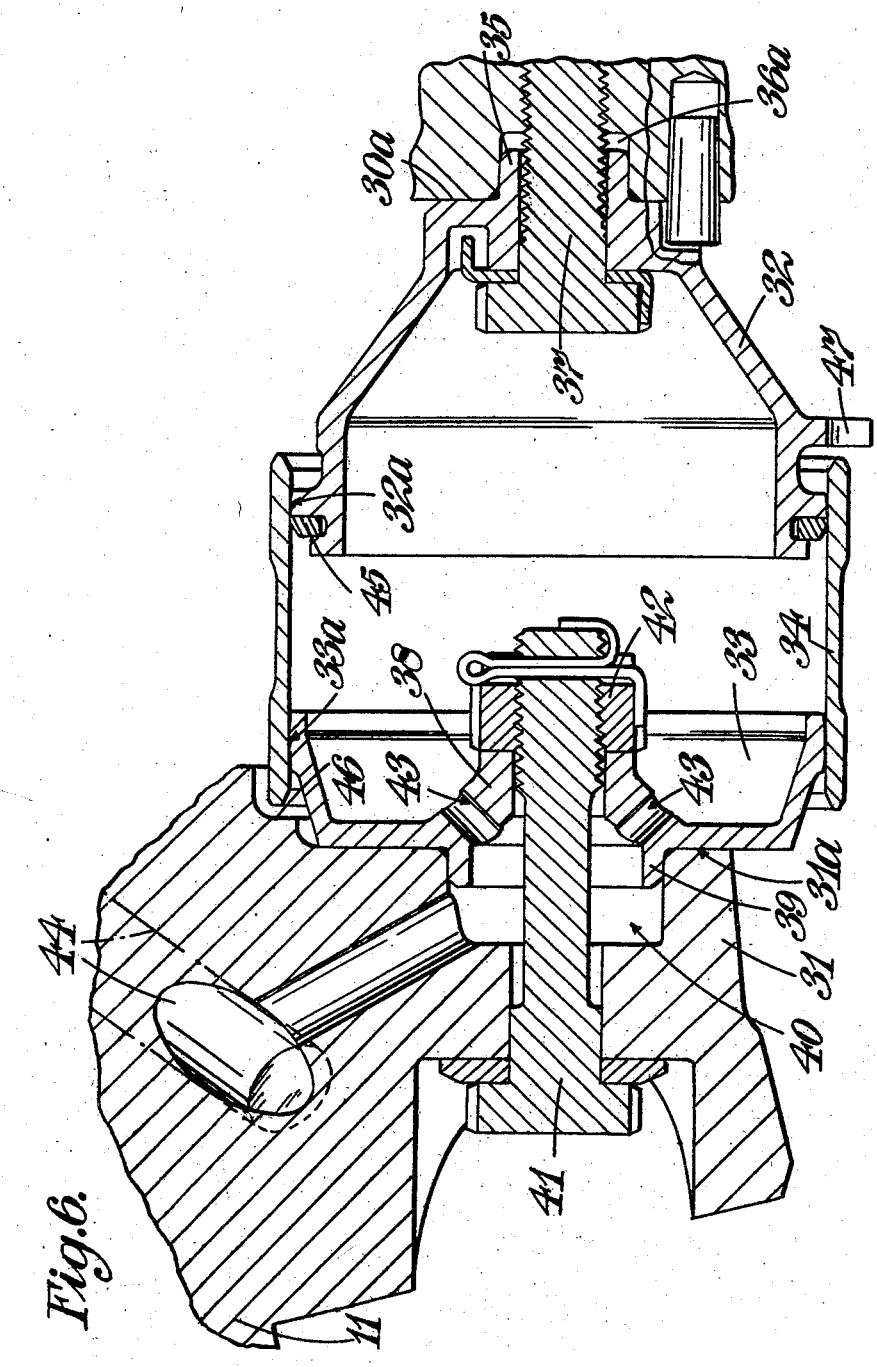

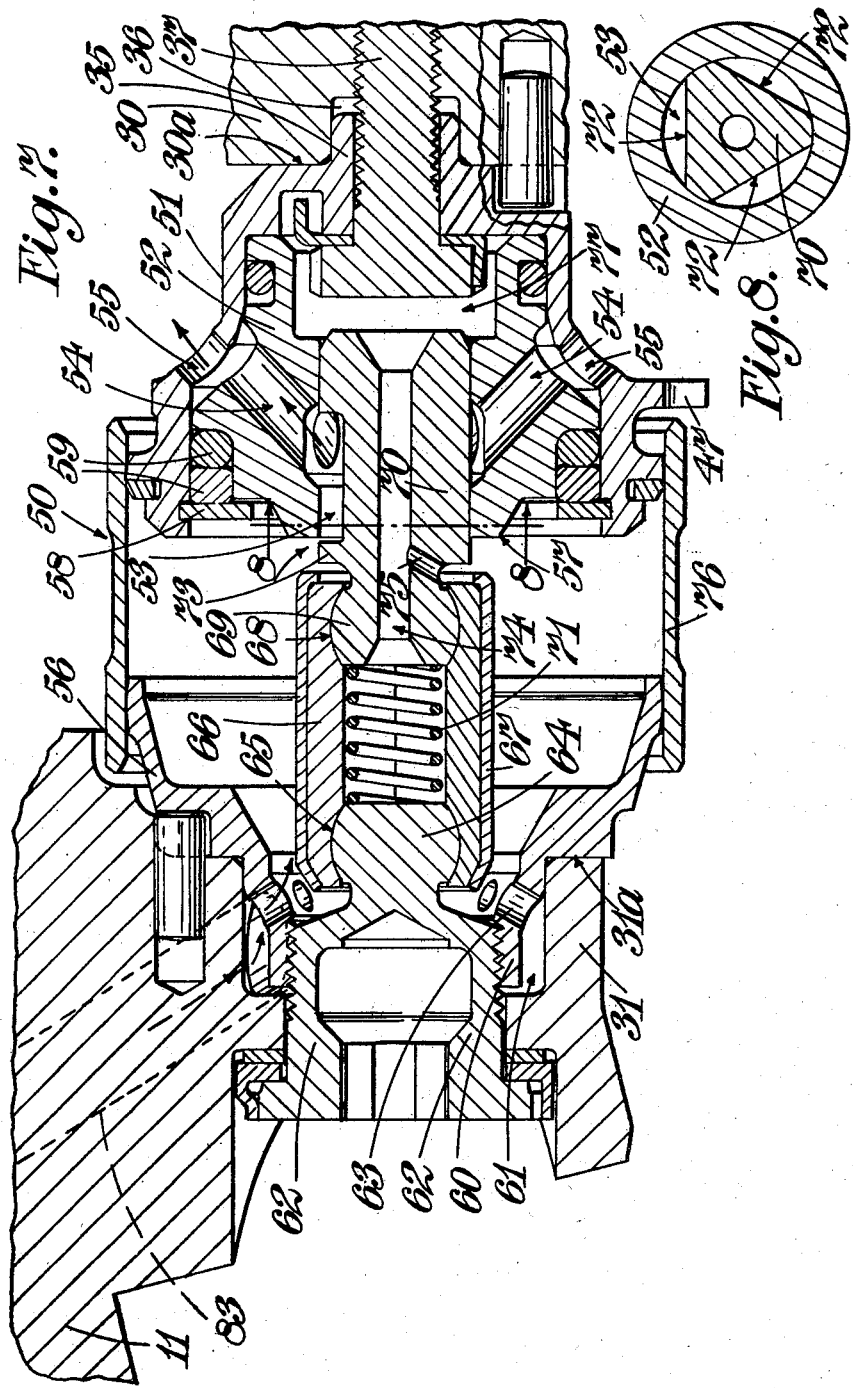

2,825,247

TORQUE-RESPONSIVE ARRANGEMENTS

Lionel Haworth, Littleover, Philip Burrows Smith, Mickleover, Cyril Blea, Alvaston, and Sidney Edward Slattery, Spondon, England, assignors to Rolls-Royce Limited, Derby, England, a British company Application January 16, 1956, Serial No. 559,352

Claims priority, application Great Britain January 18, 1955

16 Claims. (Cl. 74—801)

This invention relates to torque-responsive arrangements of the kind comprising a plurality of hydraulic piston-and-cylinder devices to which pressure fluid is supplied to oppose reaction loads developed in torque transmission, the pressure of the pressure fluid being automatically controlled by relative movements resulting from telescoping of the piston and cylinder devices. A torque-responsive arrangement as just set forth will be referred to hereinafter as "a torque-responsive arrangement of the kind specified."

Torque-responsive arrangements of the kind specified are commonly used as torquemeters, the controlled fluid pressure being used to give an indication of the torque being transmitted in a drive, and such torquemeters have been used in association with meshing helical gears to react against axial loads developed due to torque transmission through the gears and also to measure the torque being transmitted through the gears, any torque-reaction developed being taken directly to fixed structure.

This invention is concerned more specifically with torque-responsive arrangements of the kind specified for use with transmissions in which both axial loads and torque-reaction loads are developed as by the meshing of helical gears, and has for an object to provide an arrangement whereby both the axial and the torque-reaction loads are opposed hydraulically.

According to the present invention, a torque-responsive arrangement of the kind specified for use with a transmission in which both axial and torque-reaction loads are developed, comprises a floating annular member arranged to have said axial and torque-reaction loads transmitted to it, and has the plurality of piston-and-cylinder devices connected to the annular member with their axes inclined to its plane at such an angle that on supply of pressure fluid to the devices there are simultaneously produced on the annular member axial and tangential loads to oppose the torque-produced axial loads and torque-reaction loads respectively.

One important application of the present invention is in compound epicyclic gears such as are employed for transmitting a drive from a prime mover, for instance a gas-turbine engine, to an aircraft propeller and in such a use of the invention the annular member is conveniently a helical-toothed annulus gear forming the reaction member of an epicyclic gear train of the transmission and arranged to float in the gear casing, being connected to the gear casing by the plurality of piston-and-cylinder devices, the latter being disposed in annular assembly around the annulus gear and having their axes inclined to the plane of the annulus gear at an acute angle and so that the geometrical projections of their axes on to the plane of the annulus gear are substantially tangential to the annulus gear.

In one preferred arrangement of this application of the invention, there are a large number of said piston-and-cylinder devices distributed in annular assembly around the floating annular member, and one of the devices is used as a master piston-and-cylinder and comprises a valve arrangement which controls the fluid pressure within the piston-and-cylinder devices, the valve arrangement being operated by telescopic movements in the master piston-and-cylinder device.

According to a feature of this invention, the piston-and-cylinder devices may be formed in three parts comprising a pair of end cups and a surrounding cylinder into which the end cups slide, one at each end of the cylinder. With this form for the piston-and-cylinder devices, the cups at one end of the devices may be rigidly secured to the annular member and the cups at the other ends of the piston-and-cylinder devices rigidly secured to associated structure, for example fixed structure. The end cups co-operate with the cylinder in a manner to avoid substantial leakage of pressure fluid from within the piston-and-cylinder devices and in one construction each end cup has a flange provided with a spherical surface to co-operate with the cylindrical internal surface of the cylinder.

One construction illustrating the use of the invention in connection with a compound epicyclic reduction gear for use in driving an aircraft propeller from a gas-turbine engine, will now be described with reference to the accompanying drawings, in which—

Figure 2 is a view in axial section of part of the reduction gear,

Figure 3 is a view in the direction of arrow 3 on Figure 2,

Figure 5 is a view on Figure 2 from the right-hand side, parts being broken away to show details of construction, Figure 6 is a section on the line 6—6 of Figure 5, Figure 7 is a section on the line 7—7 of Figure 5, and Figure 8 is a section on the line 8—8 of Figure 7.

Figure 1:
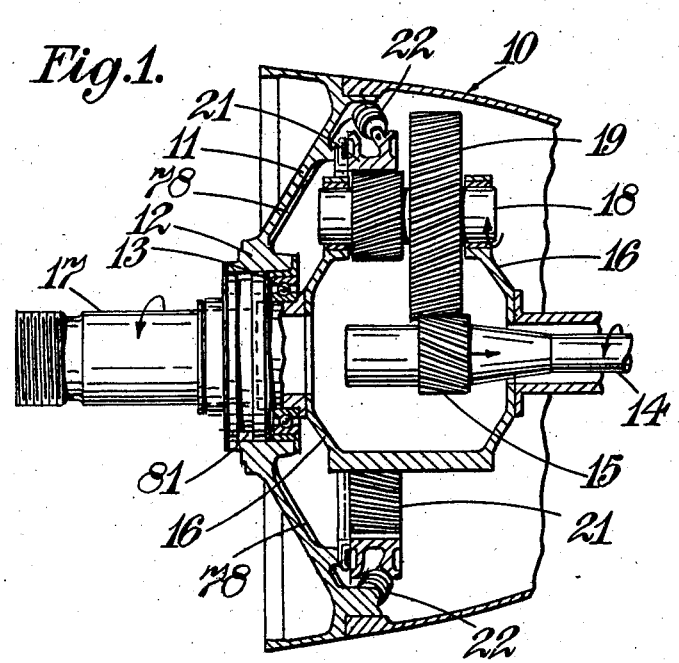
Figure 1 is a diagrammatic sectional view of the reduction gear.
Figure 4:
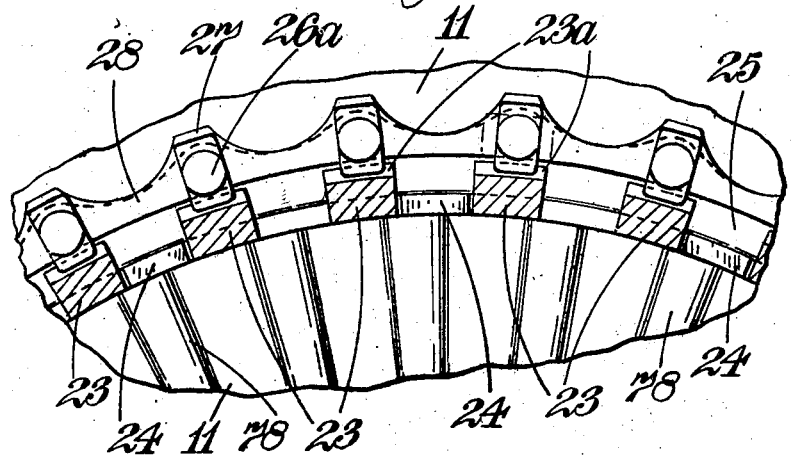
Figure 4 is a section on the line 4—4 of Figure 2.

Referring first to Figure 1, the reduction gear comprises a casing 10 including a forwardly-tapering nose casing 11 having at its centre a hollow boss 12 to receive the propeller shaft thrust bearing 13, a drive input shaft 14 carrying a helically-toothed sun gear 15, a planet carrier 16 connected to drive the propeller shaft 17, and having journalled in it the layshafts 18 of a number of compound planet members each comprising a first and larger helically-toothed planet gear 19 meshing with the sun gear 15 and a second helically-toothed planet gear 20 meshing with a helically-toothed annulus gear 21 which floats in the casing 10 but is substantially stationary in operation of the reduction gear, being the reaction member of the reduction gear. The helical teeth of the gears are of such hand that an axial thrust is developed on the annulus gear in a direction towards the aircraft propeller shaft 17 and this axial thrust is arranged to be taken onto the nose casing 11 through a large number, say 32, of piston and cylinder devices 22 arranged so as not only to oppose the axial thrusts developed on the annulus gear 21 but also to oppose torque-reaction loads on the annulus gear 21 due to torque transmission.

Referring now to Figures 2 to 5, the annulus gear 21 has its helical teeth 21a internally and has axially-projecting castellations 23, alternate gaps between the castellations 23 being engaged by narrower castellations 24 formed at the inner radius of a ring 25 secured by bolts 26 to the nose casing 11, whereby the annulus gear 21 is capable of limited angular movement with respect to the ring 25. The inter-engaging castellations 23, 24 act to limit this angular movement. The retaining bolts 26 for the castellated ring have T-shaped heads 26a which are prevented from turning by flanges at the tips of radial projections 27 on a ring 28 held in position on the nose casing 11 by the bolts 26. In assembly, the bolt heads 26a are turned to permit radial lips 23a on the castellations 23 of the annulus gear 21 to pass them axially and are then turned to bring the lips 23a behind the heads 26a to trap the annulus gear 21 and hold it against substantial axial displacement.

The annulus gear 21 is externally of channel-section and is provided between substantially radial flanges 29 of the channel with a number of circumferentially-spaced projections 30 with flats 30a (Figure 3) to provide seatings for engagement of the piston and cylinder devices 22, and the nose casing 11 has a corresponding series of bosses 31 with flats 31a for engagement by the piston and cylinder devices 22. In one position of the annulus gear the two sets of flats are parallel.

Each of the piston and cylinder devices 22 except one, the master device which is described below, comprises (Figure 6) two end cup members 32, 33 and a cylinder 34 in which the cup members slide, one at each end thereof. The cup member 32 is secured to the annulus gear, there being an axial boss 35 on the end cup to engage in a recess 36 centrally of the flat 30a on the corresponding projection 30 on the annulus gear 21, through which boss 35 a retaining stud 37 extends to have threaded engagement with a threaded bore at the bottom of the recess 36.

The other end cup 33 is formed centrally with a boss comprising axial portions 38, 39 projecting respectively internally and externally of the end cup 33. The boss portion 39 engages a recess 40 centrally of the flat 31a on the corresponding boss on the nose casing 11. The boss 31 on the nose casing 11 and the boss portions 38, 39 of the end cup 33 are axially bored for the passage of a retaining bolt 41 on which is threaded a nut 42 bearing on the boss portion 38 of the end cup. A number of holes 43 are drilled through the boss portion 38 to place the interior of the piston and cylinder device 22 in communication with a chamber bounded by the wall of the recess 40 and by the boss portion 39 and this chamber affords the inlet to the piston and cylinder device 22 for the pressure fluid, there being drillings 44 in the nose casing 11 to convey the pressure fluid to this chamber. The skirts of both end cups 32, 33 of the piston and cylinder device are formed each with an external spherical surface 32a, 33a respectively which co-operates with the internal surface of the cylinder 34, and the end cup 32 is also fitted with a piston-ring type sealing ring 45.

The cylinder of the piston and cylinder device is trapped in position with some axial play between a shoulder 46, on the boss 31 on the nose casing 11 and a radial lug 47 projecting from the end cup 32.

With the parts in position the axis 22a of each piston and cylinder 22 is inclined to the central plane of the annulus gear (see Figure 2) and the inclination and point of intersection of the axis 22a with the plane are selected so that the geometrical projection of the axis 22a on to the plane is substantially tangential to the annulus gear (see Figure 5). Since the axis is inclined to this plane it will also have a projected length axially of the annulus gear 21. Thus, when pressure fluid is fed into the cylinders, a load is produced on the annulus gear 21 which has both axial and tangential components, and the piston and cylinder devices are so arranged that their axes 22a extend from the central plane of the annulus gear in a direction such that these loads oppose the axial and torque-reaction loads on the annulus gear 21 due to torque transmission.

The pressure of the pressure fluid fed to the piston and cylinder devices 22 is controlled by telescoping of the master piston and cylinder device 50, which is of generally similar form to the other piston and cylinder devices 22, having end cups 51, 56 and a cylinder 76, but which also includes a control valve by which the pressure of the pressure fluid is controlled.

The master piston and cylinder device 50 (Figures 5, 7 and 8) has its first end cup 51 retained on the corresponding projection 30 on the annulus gear 21 in a similar manner to the end cups 32. The end cup 51 contains a member 52 forming the body of the pressure control valve. The body member 52 has a central bore 53 and has a number of drillings 54 extending outwardly from the bore 53 to open into the outer surface of the body member at a position close to a number of holes 55 in the cup member 51. These drillings 54 and holes 55 form the outlet for the pressure fluid from the master piston and cylinder device 50 into the reduction gear casing. The central bore 53 of the body member 52 opens at the end facing the other end cup 56 in a plane surface 57 which is at right angles to the axis of the piston and cylinder device 50. The body member 52 is retained in position within the end cup by means of a circular spring ring 58 which also retains suitable packing rings 59 co-operating between the periphery of the body member 52 and the internal surface of the end cup 51.

The other end cup 56 of the master piston and cylinder device 50 has an external central boss 60 with an internally-threaded bore and the boss 60 is received in a recess 61 in the corresponding boss 31 on the nose casing 11 and is retained in position in the recess 61 by means of a bolt member 62 projecting inwardly through the boss 31 on the nose casing to engage the threaded bore of boss 60. The boss 60 of the cup as before co-operates with the wall of the recess 61 to form the pressure oil supply chamber, there being holes 63 through the boss to the interior of the cup 56.

The bolt member 62 has a ball-ended projection 64 extending within the end cup 56 and the ball projection is received in a socket 65 at one end of the bore in a tubular housing 66 which is made in two semi-cylindrical halves and is retained in position on the spherical projection 64 by means of a surrounding sleeve 67. The other end of the bore of the tubular housing 66 also has a spherical socket 68 which receives a ball projection 69 of a piston valve member 70 which slides within the bore 53 of the body member 52. A spring 71 is accommodated within the bore of the tubular housing 66 to bear on the two ball projections 64, 69 to urge them apart.

The piston valve member 70 is of generally cylindrical form but has three flats 72 (Figure 8) cut into it adjacent its mid length so as to leave adjacent to the ball projection 69 a series of three segmental flanges 73 which in the normal position of the parts in operation are spaced slightly away from the plane surface 57 on the body member 52 of the valve to provide a variable-area restricted entry into the bore 53 in the body member 52. It will be appreciated that, when the torque being transmitted through the reduction gear increases, the loads applied to the annulus gear 21 tend to cause the piston and cylinder devices 22, 50 to contract and such movement will reduce the gap between the flanges 73 on the piston valve member 70 and the plane surface 57 on the body member 52, so increasing the restriction to flow of pressure fluid through the master piston and cylinder device 50 thus increasing the fluid pressure within all of the piston and cylinder devices. Conversely, a reduction in the torque allows the piston and cylinder devices 22, 50 to expand so increasing the gap and reducing the restriction to flow and consequently the fluid pressure within the piston and cylinder devices. The pressure within the piston and cylinder device will thus be an indication of the torque being transmitted.

The other end of the piston valve member 70 is cylindrical and fits within the bore 53, and a bore 74 runs through the member to connect the bore of the housing 66 with chamber 77. The bore 74 is connected by a drilling 75 to the pressure space within the cylinder 76, thus ensuring that the fluid pressures acting on the member 70 are balanced.

By a suitable selection of the disposition of the axes of the piston and cylinder devices in relation to the pitch of the helical teeth 21a, the hydraulic loads applied by the piston and cylinder devices to the annulus gear may have components opposing and substantially balancing both the axial and torque-reaction loads developed on the annulus gear 21 during torque transmission. In the arrangement shown, the angle which each axis 22a makes to the central plane of the annulus gear 21 is seen in Figure 3, and the projection of the axes on to the central plane is seen in Figure 5.

The pressure fluid may be supplied to the recesses 40, 61 in the bosses 31 on the nose casing 11 in any convenient way and in one arrangement the nose casing is formed with a number of internal ribs 78 (Figures 1, 2 and 5) extending outwards from its central boss 12 and these ribs are drilled to form the pressure fluid supply passages.

The thrust bearing 13 for the propeller shaft 17 is mounted within the central boss 12 in the nose casing 11 with a limited axial float, and this boss also accommodates air and oil seals 80 for the propeller shaft and a part which forms an oil distributing annulus 81 by which pressure oil is fed to the inner ends of the drillings 44 in the ribs 78. If desired, the pressure oil feed to the master cylinder may be made by twin drillings 83 from a main feed drilling 82 extending through an associated rib on the nose casing and leading to the annulus 81.

We claim:

1. A torque-responsive mechanism comprising stationary structure, torque transmission means wherein on torque transmission both an axial load and a torque load are developed and including an annular reaction member to which said axial and torque loads are applied, means supporting said torque-reaction member from the stationary structure including a plurality of piston-and-cylinder devices interconnecting said annular reaction member with the stationary structure, and means supplying pressure fluid to said piston-and-cylinder devices in the sense to expand them and to apply a load hydraulically to said annular reaction member, said piston-and-cylinder devices having their axes inclined to the annular reaction member at an angle such that the hydraulic load has components opposing both said axial load and said torque load.

2. A torque-responsive arrangement as claimed in claim 1, wherein there are a large number of said piston-and-cylinder devices distributed in annular assembly around the annular reaction member, and one of said piston-and-cylinder devices and comprises a valve arrangement which controls the fluid pressure within the piston-and-cylinder devices, the valve arrangement being operated by telescopic movements in said one of the piston-and-cylinder devices.

3. A torque-responsive arrangement as claimed in claim 1, wherein each of the piston-and-cylinder devices is formed in three parts comprising a pair of end cups and a surrounding cylinder into which the end cups slide, one at each end of the cylinder.

4. A torque-responsive arrangement as claimed in claim 3, wherein the end cups co-operate with the internal surface of the cylinder in a manner to avoid substantial leakage of pressure fluid from within the piston-and-cylinder devices.

5. A torque-responsive arrangement as claimed in claim 4, wherein each end cup has a flange provided with a spherical surface to co-operate with the cylindrical internal surface of the cylinder.

6. A torque-responsive arrangement as claimed in claim 3, wherein one end cup of one of said piston-and-cylinder devices carries within it a valve body having a bore coaxial with and open at one end to the space within said one of the piston-and-cylinder devices and having outlets from the bore to externally of said one of the piston-and-cylinder devices, and the other end cup has mounted in it a piston valve member slidable within the bore and having a portion co-operating with said open end of the valve body to afford a variable area restricted entry to the bore whereby flow through the valve body from internally to externally of said one of the piston-and-cylinder devices, and thus the fluid pressure within it, is varied by telescoping of the device.

7. A torque-responsive arrangement as claimed in claim 6, wherein the piston valve member is mounted in said other end cup by ball and socket connection means whereby the piston valve member is maintained coaxial with the bore during telescoping.

8. A torque-responsive arrangement as claimed in claim 7, wherein the ball and socket connection means comprises ball projections on the valve member and end cup respectively and a tubular housing having sockets for the ball projection at each of its ends.

9. An epicyclic torque transmission gear comprising a casing, an annulus gear accommodated within the casing and having helical teeth, torque-transmitting gear elements having helical teeth meshing with the helical teeth of the annulus gear whereby on torque transmission axial loads and torque loads are developed in said annulus gear, and means supporting the annulus gear within the casing against rotation comprising a plurality of piston-and-cylinder devices, each of said devices having relatively-telescoping elements secured respectively to annulus gear and the casing, means supplying fluid under pressure to said piston-and-cylinder devices and causing telescoping of said elements in the sense to apply a load hydraulically to the annulus gear, the axes of the piston-and-cylinder devices being inclined to the annulus gear at an angle such that the hydraulically-applied load opposes both said axial loads and said torque loads.

10. An epicyclic torque transmission gear as claimed in claim 9, wherein there are a large number of said piston-and-cylinder devices distributed in annular assembly around the annulus gear and one of said piston-and-cylinder devices comprises a valve arrangement which controls the fluid pressure within the piston-and-cylinder devices, the valve arrangement being operated by telescopic movements in said one of the piston-and-cylinder devices.

11. An epicyclic torque transmission gear as claimed in claim 9, wherein each of the piston-and-cylinder devices is formed in three parts comprising a pair of end cups and a surrounding cylinder into which the end cups slide, one at each end of the cylinder.

12. An epicyclic torque transmission gear as claimed in claim 11, wherein the end cups cooperate with the internal surface of the cylinder in a manner to avoid substantial leakage of pressure fluid from within the piston-and-cylinder devices.

13. An epicyclic torque transmission gear as claimed in claim 12, wherein each end cup has a flange provided with a spherical surface to cooperate with the cylindrical internal surface of the cylinder.

14. An epicyclic torque transmission gear as claimed in claim 9 wherein one end cup of one of said piston-and-cylinder devices carries within it a valve body having a bore coaxial with and open at one end to the space within said one of the piston-and-cylinder devices and having outlets from the bore to externally of said one of the piston-and-cylinder devices, and the other end cup has mounted in it a piston valve member slidable within the bore and having a portion cooperating with said open end of the valve body to afford a variable area restricted entry to the bore whereby flow through the valve body from internally to externally of said one of the piston-and-cylinder devices, and thus the fluid pressure within it, is varied by telescoping of the device.

15. An epicyclic torque transmission gear as claimed in claim 14, wherein the piston valve member is mounted in said other end cup by ball and socket connection means whereby the piston valve member is maintained coaxial with the bore during telescoping.

16. An epicyclic torque transmission gear as claimed in claim 15, wherein the ball and socket connection means comprises ball projections on the valve member and end cup respectively and a tubular housing having sockets for the ball projection at each of its ends.

References Cited in the file of this patent
UNITED STATES PATENTS

| | | |
|---|---|---|
| 2,444,363 | Newcomb | June 29, 1948 |
| 2,715,834 | Chamberlin | Aug. 23, 1955 |
| 2,724,266 | Baker | Nov. 22, 1955 |